United States Patent
Chou et al.

(10) Patent No.: US 11,025,515 B2
(45) Date of Patent: *Jun. 1, 2021

(54) DEVICES AND METHODS OF USING NETWORK FUNCTION VIRTUALIZATION AND VIRTUALIZED RESOURCES PERFORMANCE DATA TO IMPROVE PERFORMANCE

(71) Applicant: Apple Inc., Cupertino, CA (US)

(72) Inventors: Joey Chou, Scottsdale, AZ (US); Valerie Parker, Portland, OR (US)

(73) Assignee: Apple Inc., Cupertino, CA (US)

( * ) Notice: Subject to any disclaimer, the term of this patent is extended or adjusted under 35 U.S.C. 154(b) by 416 days.

This patent is subject to a terminal disclaimer.

(21) Appl. No.: 15/764,469

(22) PCT Filed: Dec. 22, 2015

(86) PCT No.: PCT/US2015/067280
§ 371 (c)(1),
(2) Date: Mar. 29, 2018

(87) PCT Pub. No.: WO2017/058274
PCT Pub. Date: Apr. 6, 2017

(65) Prior Publication Data
US 2018/0262410 A1   Sep. 13, 2018

Related U.S. Application Data

(60) Provisional application No. 62/235,372, filed on Sep. 30, 2015.

(51) Int. Cl.
*G06F 9/455* (2018.01)
*G06F 9/46* (2006.01)
(Continued)

(52) U.S. Cl.
CPC .......... *H04L 43/08* (2013.01); *G06F 9/45558* (2013.01); *G06F 9/5077* (2013.01);
(Continued)

(58) Field of Classification Search
CPC ..... H04L 43/08; H04L 43/06; H04L 41/5009; H04L 41/044; H04L 41/0896;
(Continued)

(56) References Cited

U.S. PATENT DOCUMENTS

| 2009/0222549 A1* | 9/2009 | Gilbert | ................ G06F 11/3452 709/224 |
|---|---|---|---|
| 2015/0082308 A1 | 3/2015 | Kiess et al. | |

(Continued)

FOREIGN PATENT DOCUMENTS

| WO | WO-2017058274 A1 * | 4/2017 | ............. H04L 43/08 |
|---|---|---|---|
| WO | 2017078790 | 5/2017 | |

OTHER PUBLICATIONS

"ETSI; Network Functions Virtualisation (NFV); Management and Orchestration", ETSI GS NFV-MAN 001 v1.1.1, See sections 5.3, 5.4.2, 5.5.1, 5.6.2, 5.7.1, 5.7.4, 5.7.7, 7.6.1,B.4.4.1-B.4.4.2, B.6; and figures 5.1, B.13-B.14, B.18., [Online] Retrieved from the Internet : <http://www.etsi.org/deliver/etsi_gs/NFV-MAN/001_099/001/01.00.01_60/gs_nfv-man001v010101p.pdf>, 31 pgs.

(Continued)

*Primary Examiner* — Bradley A Teets
(74) *Attorney, Agent, or Firm* — Kowert, Hood, Munyon, Rankin & Goetzel, P.C.

(57) ABSTRACT

Devices and methods of providing performance measurements (PMs) for Network Function Virtualization are generally described. A Virtual Network Function (VNF) PM job is scheduled at a VNF and VNF PM data received in response. From the VNF PM data, it is determined that virtualized resource (VR) management may be a cause of (Continued)

poor VNF performance. A VR PM job is scheduled and results in VR PM data. The VR PM and VNF PM data are analyzed to determine whether to increase the VR at the VNF. If an increase is determined, a request for the increase is transmitted from an element manager to a VNF manager or the VNF PM and/or VR PM data are provided to a Network Manager (NM) for the NM to request the increase by a Network Function Virtualization Orchestrator (NFVO).

24 Claims, 6 Drawing Sheets

(51) Int. Cl.
| | | |
|---|---|---|
| *H04L 12/26* | (2006.01) | |
| *H04L 12/24* | (2006.01) | |
| *G06F 9/50* | (2006.01) | |
| *H04L 12/931* | (2013.01) | |

(52) U.S. Cl.
CPC .......... *H04L 41/5009* (2013.01); *H04L 43/06* (2013.01); *H04L 49/501* (2013.01); *G06F 2009/45595* (2013.01); *H04L 41/044* (2013.01); *H04L 41/0896* (2013.01)

(58) Field of Classification Search
CPC . H04L 49/501; G06F 9/45558; G06F 9/5077; G06F 2009/45595
USPC ..................................................... 718/1, 105
See application file for complete search history.

(56) References Cited

U.S. PATENT DOCUMENTS

| | | | | |
|---|---|---|---|---|
| 2015/0156135 | A1* | 6/2015 | Brandwine | G06F 9/45533 709/226 |
| 2016/0359682 | A1* | 12/2016 | Senarath | H04L 41/0896 |
| 2018/0013656 | A1* | 1/2018 | Chen | H04W 24/04 |
| 2018/0241630 | A1* | 8/2018 | Andrianov | G06F 9/45558 |
| 2019/0334796 | A1* | 10/2019 | Chou | G06F 9/45558 |

OTHER PUBLICATIONS

"International Application Serial No. PCT/US2015/067280, International Search Report dated Jun. 30, 2016", 5 pgs.
"International Application Serial No. PCT/US2015/067280, Written Opinion dated Jun. 30, 2016", 13 pgs.
Huawei, et al., "Adding performance management requirements", S5-154192, 3GPP TSG-SA WG5 #102, Beijing, China, See sections 6.1.X.1-6.1.X.2., (Aug. 14, 2015).
Intel, "New WID Performance management for mobile networks that include virtualized network function", S5-154457, 3GPP TSG-SA WG5 #102, Beijing, China, See section 4., (Aug. 28, 2015).
Intel, "Virtualized resource performance measurements use case", S5-154445, 3GPP TSG-SA WG5 #102, Beijing, China,See sections 5.3.2.3-5.3.2.4., (Aug. 2015), 3 pgs.
"European Application Serial No. 15905645.6, Extended European Search Report dated Mar. 1, 2019", 12 pgs.
"Network Functions Virtualisation (NFV); Management and Orchestration", Group Specification, European Telecommunications Standards Institute (ETSI), 650, Route Des Lucioles; F-06921 Sophia Antipolis; France, vol. NFV MAN, No. V1.1.1, (Dec. 1, 2014), 1-184.
Intel, "Add PM concepts", 3gpp Draft; S5-155079 Pcr Ts 28.520 Add Pm Concept. 3rd Generation Partnership Project (3GPP). Mobile Competence Centre 650. Route Des Lucioles ; F-06921 Sophia-Antipolis Cedex ; France vol. Sa Wg5. No. Vancouver. Canada;, [Online] Retrieved from the internet:www.3gpp.org ftp Meetings 3GPP SYNC SA5 Docs , (Oct. 11, 2015), 3 pgs.

* cited by examiner

DEVICES AND METHODS OF USING NETWORK FUNCTION VIRTUALIZATION AND VIRTUALIZED RESOURCES PERFORMANCE DATA TO IMPROVE PERFORMANCE

PRIORITY CLAIM

This application is a U.S. National Stage Filing under 35 U.S.C. 371 from International Application No. PCT/US2015/067280, filed Dec. 22, 2015 and published in English as WO 2017/058274 on Apr. 6, 2017, which claims the benefit of priority to U.S. Provisional Patent Application Ser. No. 62/235,372, filed Sep. 30, 2015, and entitled "USING VNF AND VR PERFORMANCE DATA TO IMPROVE BNF PERFORMANCE," each of which is incorporated herein by reference in their entirety.

TECHNICAL FIELD

Embodiments pertain to radio access networks. Some embodiments relate to Network Function Virtualization (NFV) in cellular networks, including Third Generation Partnership Project Long Term Evolution (3GPP LTE) networks and LTE advanced (LTE-A) networks as well as $4^{th}$ generation (4G) networks and $5^{th}$ generation (5G) networks. Some embodiments relate to NFV performance measurements.

BACKGROUND

With the vast increase in number and diversity of communication devices, the corresponding network environment, including routers, switches, bridges, gateways, firewalls, and load balancers, has become increasingly complicated. To add complexity to the variety of services provided by the network devices, many physical implementations of the network devices are propriety and may be unable to incorporate new or adjusted physical components to compensate for different network conditions. This has led to the development of Network Function Virtualization (NFV), which may provide a virtualized environment able to provide any network function or service able to be delivered on proprietary, application specific hardware as software applications called Virtual Network Functions (VNFs). The use of NFV may provide flexibility in configuring network elements, enabling dynamic network optimization and quicker adaptation of new technologies. It would be desirable to provide virtualized resource performance measurements to optimize the VNF performance and NFV infrastructure (NFVI).

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
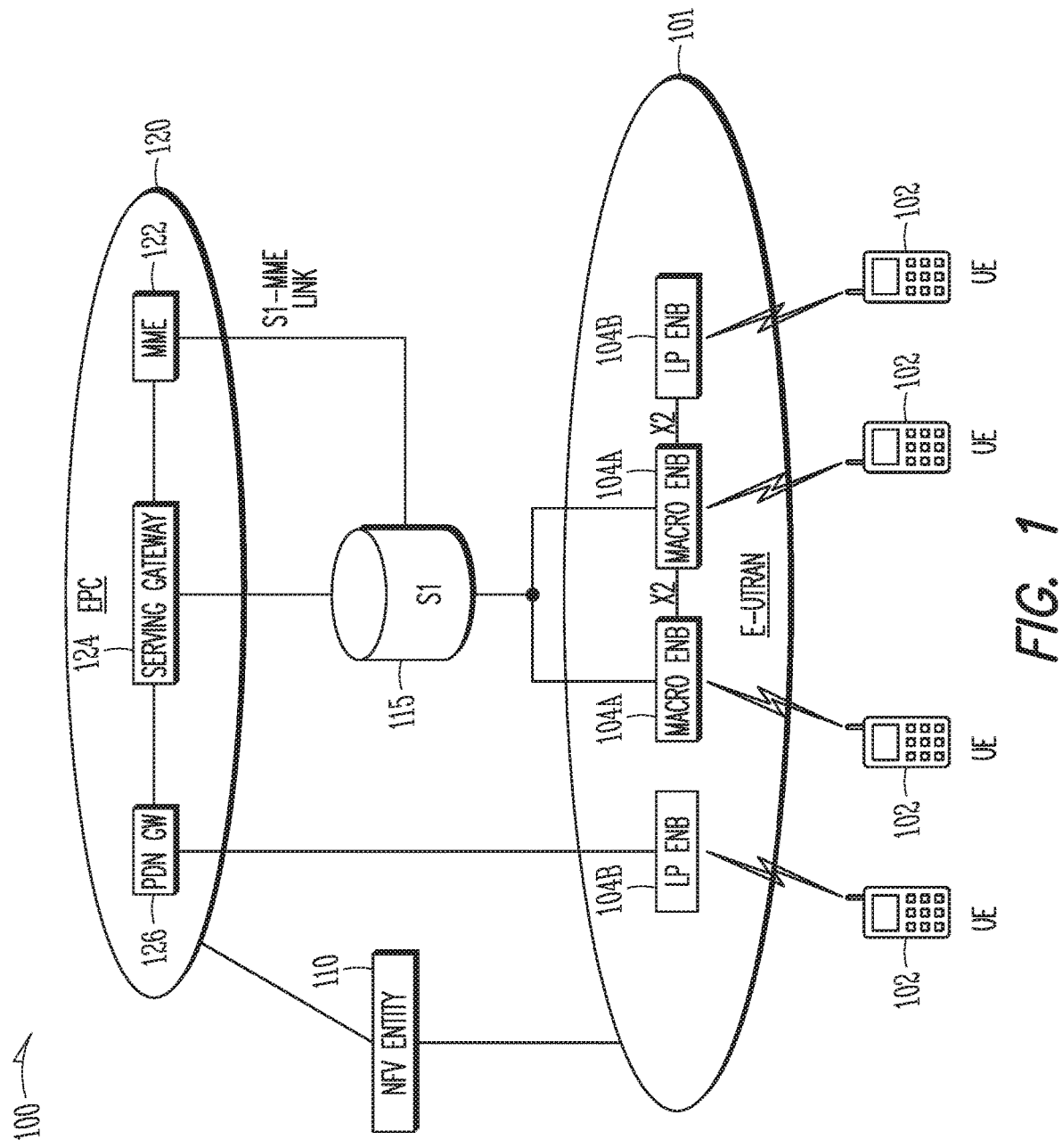
FIG. 1 is a functional diagram of a wireless network in accordance with some embodiments.

FIG. 1 shows an example of a portion of an end-to-end network architecture of a Long Term Evolution (LTE) network with various components of the network in accordance with some embodiments. At least some of the network devices with which the UEs 102 are connected and that provide network functionality, such as the gateways and other servers, may be provided as part of a NFVI rather than using physical hardware components, as described herein. In some embodiments, a NFV entity 110 may separately control or be in communication with at least some of the physical components. As used herein, an LTE network refers to both LTE and LTE Advanced (LTE-A) networks as well as other versions of LTE networks to be developed. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example.

The core network 120 may include a mobility management entity (MME) 122, serving gateway (serving GW) 124, and packet data network gateway (PDN GW) 126. The RAN 101 may include evolved node Bs (eNBs) 104 (which may operate as base stations) for communicating with user equipment (UE) 102. The eNBs 104 may include macro eNBs 104a and low power (LP) eNBs 104b. The eNBs 104 and UEs 102 may employ the synchronization techniques as described herein.

The MME 122 may be similar in function to the control plane of legacy Serving GPRS Support Nodes (SGSN). The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes.

The PDN GW 126 may terminate a SGi interface toward the packet data network (PDN). The PDN GW 126 may route data packets between the EPC 120 and the external PDN, and may perform policy enforcement and charging data collection. The PDN GW 126 may also provide an anchor point for mobility devices with non-LTE access. The external PDN can be any kind of IP network, as well as an IP Multimedia Subsystem (IMS) domain. The PDN GW 126 and the serving GW 124 may be implemented in a single physical node or separate physical nodes.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells 104b may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the term LP eNB refers to any suitable relatively LP eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 104b might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB 104a via an X2 interface. Picocell cNBs or other LP eNBs LP cNB 104b may incorporate some or all functionality of a macro eNB LP eNB 104a. In some cases, this may be referred to as an access point base station or enterprise femtocell.

Figure 2:
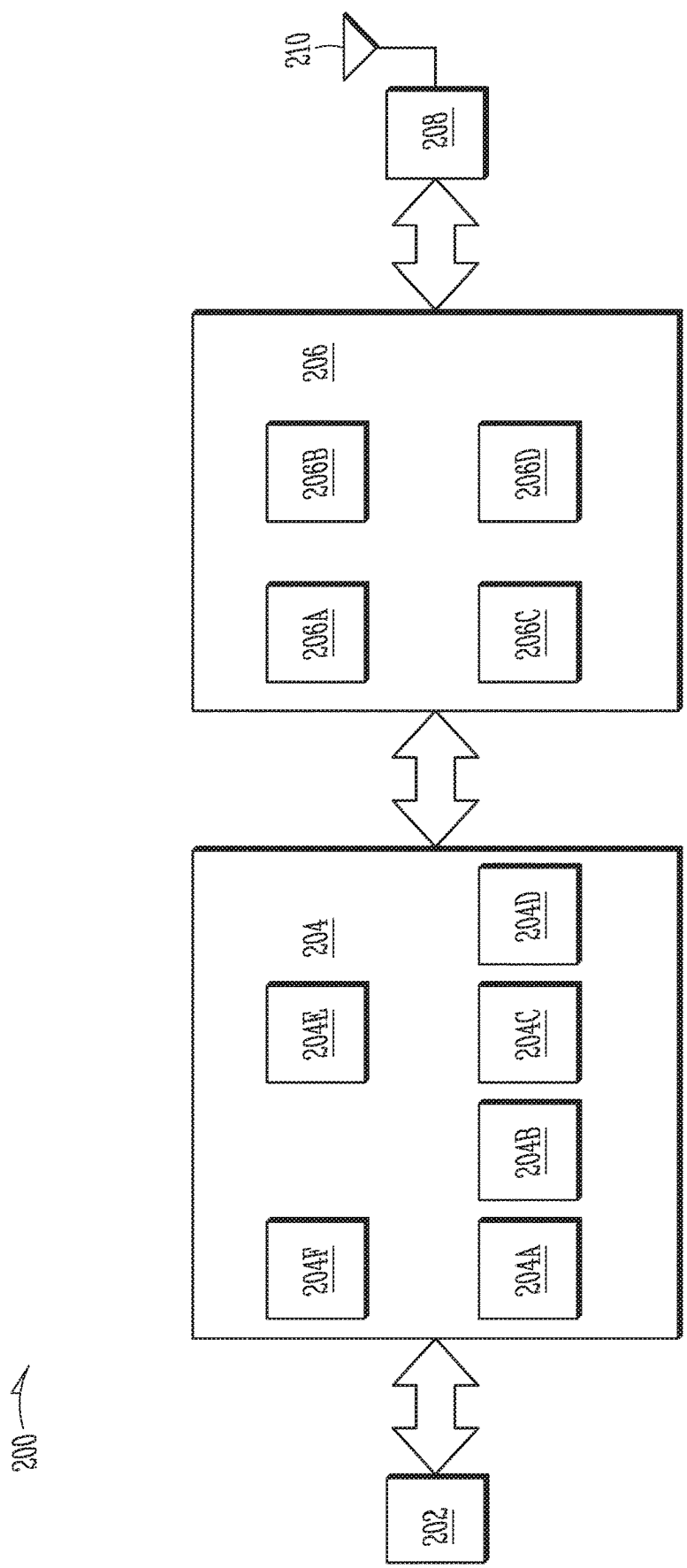
FIG. 2 illustrates components of a communication device in accordance with some embodiments.

Embodiments described herein may be implemented into a system using any suitably configured hardware and/or software. FIG. 2 illustrates components of a UE in accordance with some embodiments. At least some of the components shown may be used in an eNB or NFV entity, for example, as shown in FIG. 1. The UE 200 may be one of the UEs 102 shown in FIG. 1 and may be a stationary, non-mobile device or may be a mobile device. In some embodiments, the UE 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as the eNB may contain some or all of the components shown in FIG. 2. Other of the network elements, such as the MME, may contain an interface, such as the S1 interface, to communicate with the eNB over a wired connection regarding the UE.

Embodiments described herein may be implemented into a system using any suitably configured hardware and/or software. FIG. 2 illustrates components of a UE in accordance with some embodiments. At least some of the components shown may be used in an eNB or MME, for example, such as the UE 102 or eNB 104 shown in FIG. 1. The UE 200 and other components may be configured to use the synchronization signals as described herein. The UE 200 may be one of the UEs 102 shown in FIG. 1 and may be a stationary, non-mobile device or may be a mobile device. In some embodiments, the UE 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as the eNB may contain some or all of the components shown in FIG. 2. Other of the network elements, such as the MME, may contain an interface, such as the S1 interface, to communicate with the eNB over a wired connection regarding the UE.

The application or processing circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include FFT, precoding, and/or constellation mapping/demapping functionality. In some embodiments, encoding/decoding circuitry of the baseband circuitry 204 may include convolution, tail-biting convolution, turbo. Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC. PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the UE 200 may include additional elements such as, for example, memory/storage, display, camera, sensor, and/or input/output (I/O) interface as described in more detail below. In some embodiments, the UE 200 described herein may be part of a portable wireless communication device, such as a personal digital assistant (PDA), a laptop or portable computer with wireless communication capability, a web tablet a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 200 may include one or more user interfaces designed to enable user interaction with the system and/or peripheral component interfaces designed to enable peripheral component interaction with the system. For example, the UE 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the UE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
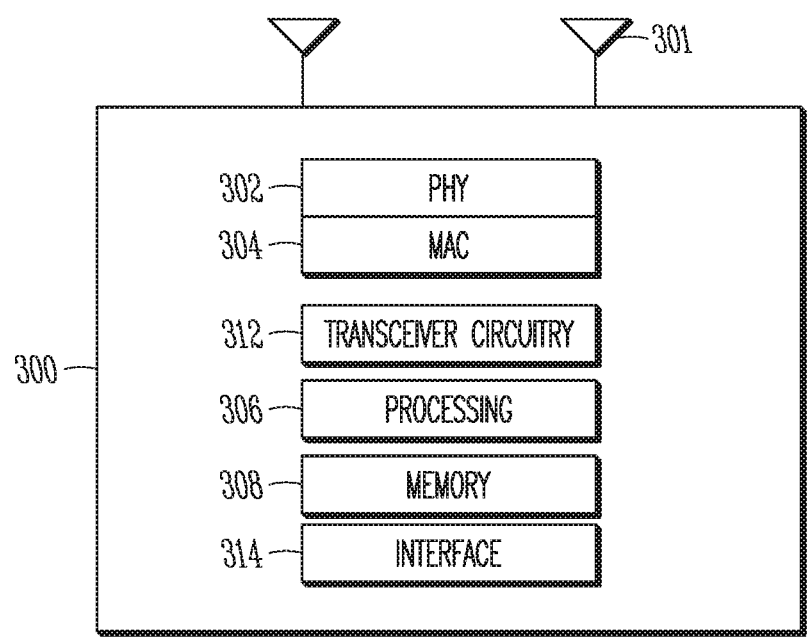
FIG. 3 illustrates a block diagram of a communication device in accordance with some embodiments.

FIG. 3 is a block diagram of a communication device in accordance with some embodiments. The device may be a UE or eNB or NFV entity, for example, such as the UE 102 or eNB 104 shown in FIG. 1 that may be configured to track the UE as described herein. The physical layer circuitry 302 may perform various encoding and decoding functions that may include formation of baseband signals for transmission and decoding of received signals. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 300 can be configured to operate in accordance with 3GPP standards or other protocols or standards, including WiMax, WiFi, GSM, EDGE, GERAN, UMTS, UTRAN, or other 3G, 3G, 4G, 5G, etc. technologies either already developed or to be developed. The communication device 300 may include transceiver circuitry 312 to enable communication with other external devices wirelessly and interfaces 314 to enable wired communication with other external devices. As another example, the transceiver circuitry 312 may perform various transmission and reception functions such as conversion of signals between a baseband range and a Radio Frequency (RF) range.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 4:
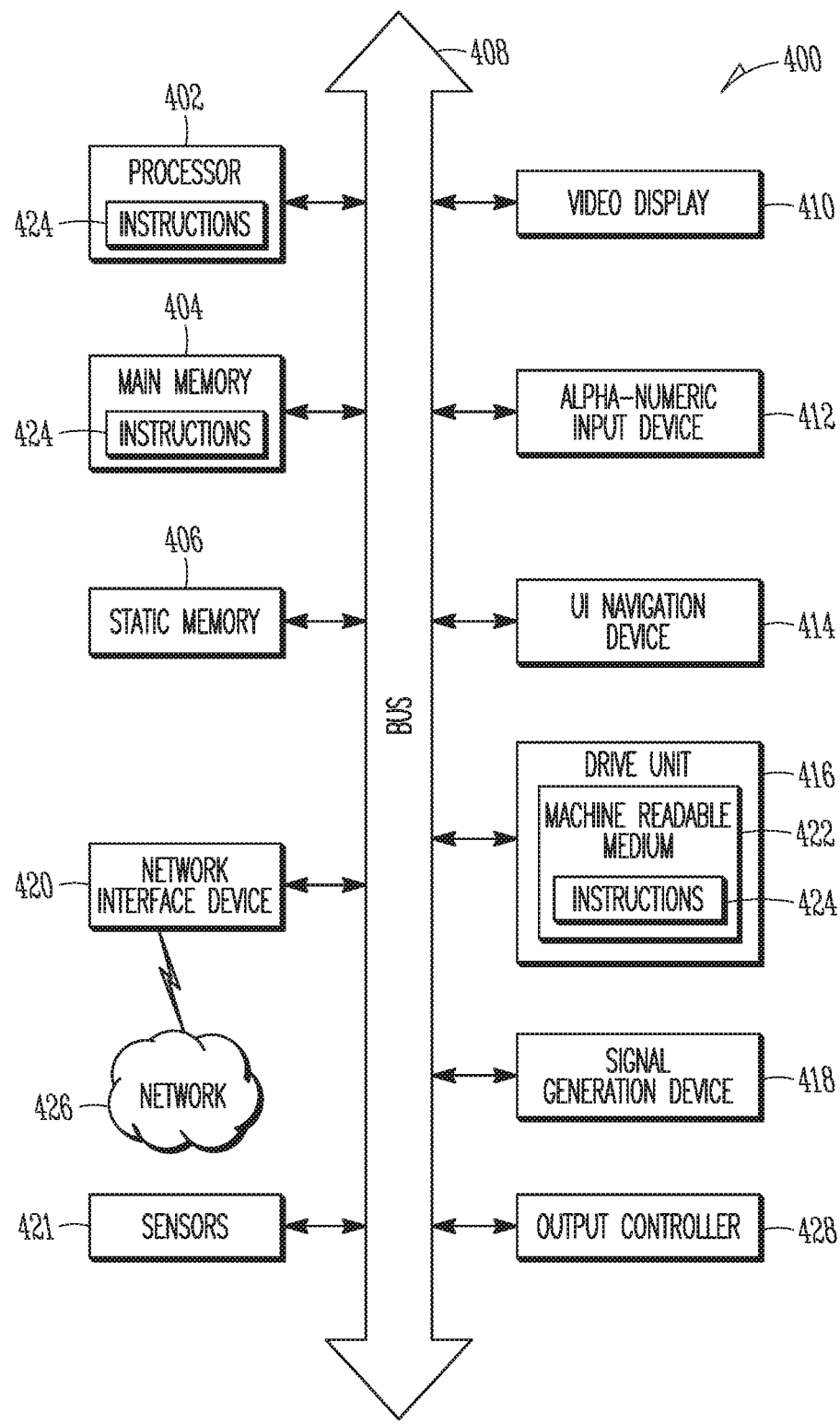
FIG. 4 illustrates another block diagram of a communication device in accordance with some embodiments.

FIG. 4 illustrates another block diagram of a communication device in accordance with some embodiments. In alternative embodiments, the communication device 400 may operate as a standalone device or may be connected (e.g., networked) to other communication devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a NFV entity, a UE, eNB. PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO). MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

The network and components shown in FIGS. 1-4 may be implemented in hardware or software or a combination thereof. In particular, as discussed above, the network may be wholly or partially implemented using network virtualization. Network virtualization has started to be used extensively, particularly in server deployments and data centers. Virtual Network Functions are software implementations of network functions that can be deployed on a NFVI, which may include both hardware and software components of the network environment. Network Function Virtualization may thus virtualize separate network node functions into connected blocks that create communication services and exhibit public land mobile network (PLMN)-system behavior. Unlike conventional network hardware layouts in which a server may run a single instance of an operating system on physical hardware resources (e.g., CPU. RAM), the network operator may deploy VNFs on the NFVI to provide enhanced flexibility for network resource utilization, among others. In some embodiments, as described in more detail below, actual resources may be dynamically allocated, updated, and deallocated based on the functionality desired. To this end, the hardware may support virtual machines (VMs) having multiple operating systems and individualized amounts and types of virtualized resources.

To further enhance VNF and NFVI performance, virtualized resource performance measurements related to network services, VNF applications, and virtualized resources that are measured in VNF and NFVI may be used. Such performance measurements may help to ensure that the VNFs deployed on the NFV infrastructure is able to deliver a consistent and acceptable service quality to end users (UEs) as well as providing timely isolation and correction of failure conditions. The performance measurements may be used to reflect the impact of services offered by the NFVI on the VNFs, as well as the inherent nature of the services being offered by the NFVI, for example, CPU, virtual machines, memory, and Virtual Networks.

Figure 5:
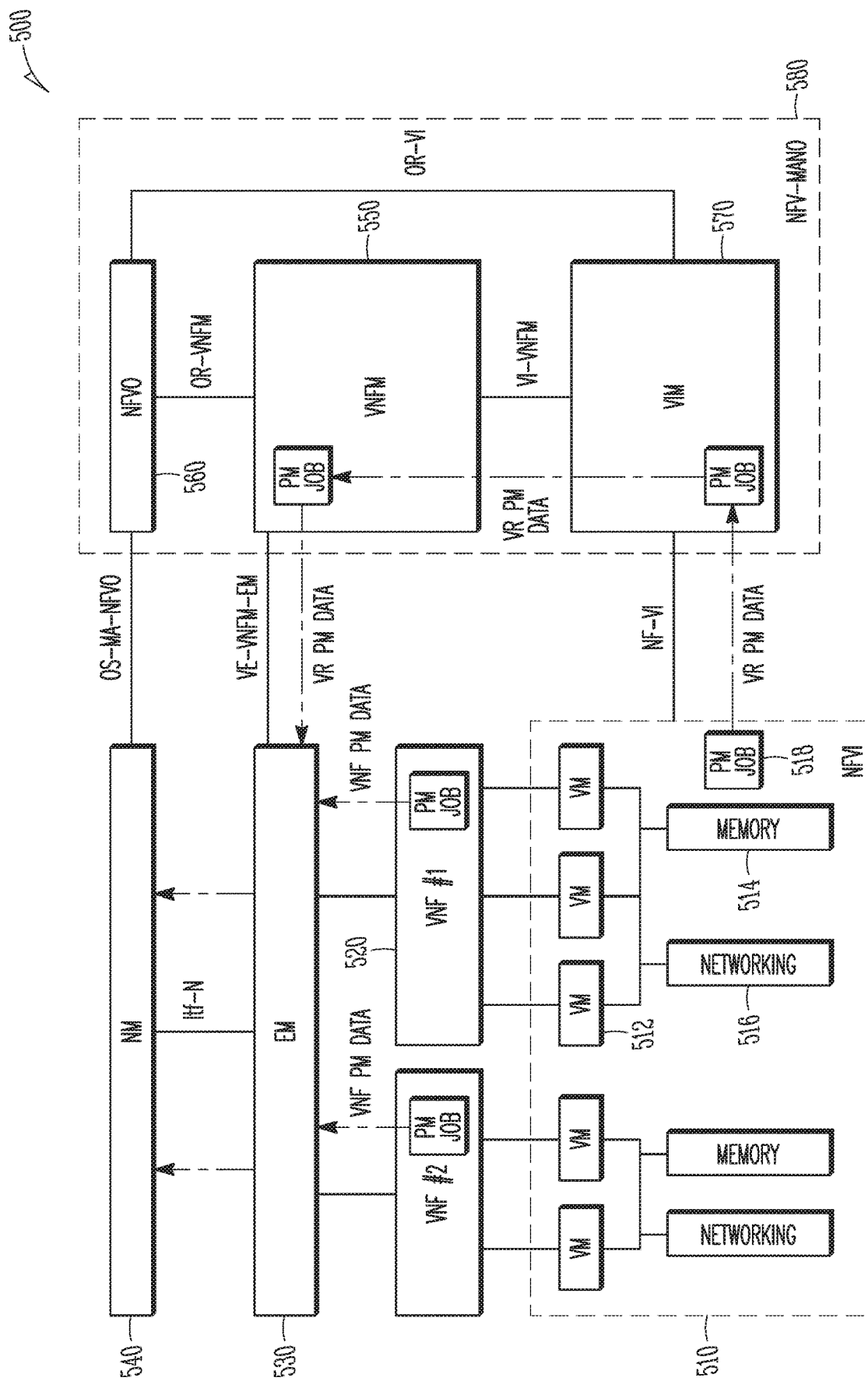
FIG. 5 illustrates a NFV entity in accordance with some embodiments.

FIG. 5 illustrates a NFV entity in accordance with some embodiments. As illustrated, the NFV entity 500 may include a number of elements (each of which may contain physical and/or virtualized components), including the NVFI 510, one or more VNFs 520, a Network Element Manager (EM) 530, a Network Manager (NM) 540, a Virtualized Infrastructure Manager (VIM) 540, a VNF Manager (VNFM) 550, and a Network Function Virtualization Orchestrator (NFVO) 560. For example, a data center comprising one or more servers in the network may comprise the NFV entity 500. The NFV entity 500, in some embodiments, may include one or more physical devices and/or one or more applications hosted on a distributed computing platform, a cloud computing platform, a centralized hardware system, a server, a computing device, and/or an external network-to-network interface device, among others. In some cases, the virtualized resource performance measurement may include, for example, latency, jitter, bandwidth, packet loss, nodal connectivity, compute and/or storage resources, accounting, fault and/or security measurements. The elements of the NFV entity 500 may thus be contained in one or more of the devices shown in FIGS. 1-4 or other devices.

The NFV Management and Orchestration (NFV-MANO) 570 may manage the NFVI 510 and orchestrate the instantiation of network services, and the allocation of resources used by the VNFs 520. The NFV-MANO 580 may integrate with an Operations Support System/Business Support System (OSS/BSS) (not shown), using interfaces offered by the OSS/BSS and the NFV-MANO 580 interfaces to be used by external entities to deliver various NFV business benefits. The OSS/BSS may include the collection of systems and management applications that a service provider (such as a telephone operator or telecommunications company) use to operate their business: management of customers, ordering, products and revenues—for example, payment or account transactions, as well as telecommunications network components and supporting processes including network component configuration, network service provisioning and fault handling. The NFV-MANO 580 may create or terminate a VNF, increase or decrease the VNF capacity, or update or upgrade software and/or configuration of a VNF. The NFV-MANO 580 may include a Virtualized Infrastructure Manager (VIM) 540, a VNF Manager (VNFM) 550 and a NFV Orchestrator (NFVO) 560. The NFV-MANO may have access to various data repositories including network services, VNFs available, NFV instances and NFVI resources with which to determine resource allocation.

The NFVO 560 may orchestrate NFVI resources via multiple VIMs 540 and manage the lifecycle of different network services. The former may involve discovering available services, managing virtualized resource availability/allocation/release and providing virtualized resource fault/performance management (PM). Lifecycle management may include registering a network service and ensuring that the templates describing the network service are catalogued, instantiating a network service from the template, scaling and updating the network service and terminating the network service, releasing the NFVI resources for the service to the NFVI resource pool to be used by other services. The NFVO may coordinate VNFs as network services that jointly realize a more complex function, including joint instantiation and configuration, configuring required connections between different VNFs. and managing dynamic changes of the configuration.

The VNFM 550 may be responsible for the lifecycle management of the VNFs 520. The VNFM 550 may be assigned the management of a single VNF 520, or the management of multiple VNFs 520 of the same type or of different types. Thus, although only one VNFM 550 is shown in FIG. 5, different VNFMs 550 may be associated with the different VNFs 520 for the performance measurement job 518 described in more detail below. The VNFM 550 may provide a number of VNF functionalities, including instantiation (and configuration if required by the VNF deployment template), software update/upgrade, modification, scaling out/in and up/down, collection of NFVI performance measurement results and faults/events information and correlation to VNF instance-related events/faults, healing, termination, lifecycle management change notification, integrity management, and event reporting.

The VIM 570 may be responsible for controlling and managing the NFVI compute, storage and network resources, usually within one operator's Infrastructure Domain. The VIM 570 may be specialized in handling a certain type of NFVI resource (e.g. compute-only, storage-only, networking-only), or may be capable of managing multiple types of NFVI resources. The VIM 570 may, among others, orchestrate the allocation/upgrade/release/reclamation of NFVI resources (including the optimization of such resources usage) and manage the association of the virtualized resources to the physical compute, storage, networking resources, and manage repository inventory-related information of NFVI hardware resources (compute, storage, networking) and software resources (e.g. hypervisors), and discovery of the capabilities and features (e.g. related to usage optimization) of such resources.

The NVFI 510 may itself contain various virtualized and non-virtualized resources. These may include a plurality of virtual machines (VMs) 512 that may provide computational abilities (CPU), one or more memories 514 that may provide storage at either block or file-system level and one or more networking elements 516 that may include networks, subnets, ports, addresses, links and forwarding rules to ensure intra- and inter-VNF connectivity. Each VM 512 may be associated with one of the memories 514 and one of the networking elements 516. In some embodiments, multiple VMs 512 may serve the same memory 514 and the same networking element 516. As shown, in some embodiments, one memory 514 and networking element 516 may serve one set of VMs 512 and another memory 514 and networking element 516 may serve another set of VMs 512, with the number of VMs 512 in each set different.

Each set of VMs 512 may serve a different VNF 520, dependent on the resources desired by the VNF 520. Each VNF 520 may provide a network function that is decoupled from infrastructure resources (computational resources, networking resources, memory) used to provide the network function. Although not shown, the VNFs 520 can be chained with other VNFs 520 and/or other physical network function to realize a network service. The virtualized resources may provide the VNFs 520 with desired resources. Resource allocation in the NFVI 510 may simultaneously meet numerous requirements and constraints, such as low latency or high bandwidth links to other communication endpoints.

The VNFs 520 may be managed by one or more EMs 530. Although only one EM 530 is shown in FIG. 5, one or more of the VNFs 520 may be managed by different EMs 530. The EM 530 may provide end-user functions for management of a set of network elements. The EM 530 may manage individual network elements and network elements of a sub-network, which may include relations between the network elements. In particular, the EM 530 may be responsible for configuration for the network functions provided by a VNF 520, fault management for the network functions provided by the VNF 520, accounting for the usage of VNF functions, collecting performance measurement results for the functions provided by the VNF 520, and security management for the VNF functions.

The EM 530 may be managed by a NM 540. The NM 540 may provide end-user functions with the responsibility for the management of a network, mainly as supported by the EM 530 but may also involve direct access to the network elements. The NM 540 may be connected to the EM 530 through an Itf-N interface. The NM 540 may connect and disconnect VNF external interfaces to physical network function interfaces at the request of the NFVO 560.

The various components of the system may be connected through different reference points. These references points between the NFV-MANO and the functional blocks of the system may include Os-Ma-Nfvo between the NM 540 and NFVO 560, Ve-Vnfm-Em between the EM 530 and the VNFM 550, Ve-Vnfm-Vnf between a VNF 520 and the VNFM 550. Nf-Vi between the NFVI 510 and the VIM 570, Or-Vnfm between the NFVO 560 and the VNFM 550, Or-Vi between the NFVO 560 and the VIM 570, and Vi-Vnfm, a reference point between the VIM 570 and the VNFM 550. An Or-Vi interface may implement the VNF software image management interface and interfaces for the management of virtualized resources, their catalogue, performance and failure on the Or-Vi reference point. An Or-Vnfm interface may implement a virtualized resource management interface on the Or-Vnfm reference point. A Ve-Vnfm interface may implement a virtualized resource performance/fault management on the Ve-Vnfm reference point.

To better provide network services, evaluation of the system behavior exhibited by the NFVI 510 may be desirable. This evaluation may be determined using performance data collected and recorded by the VNF(s) 520 according to a schedule established by the EM 530. The range of performance measurements may be defined in 3GPP Technical Specification (TS) 32.426. However, not all of the measurements in TS 32.426 may be constantly used, or from every VNF 520. Therefore, it is desirable to administer the measurements to determine which measurement types, on which measured resources, and at which times, are to be executed per TS 32.410.

As above, Network Function Virtualization permits migration of the execution of network functions from vertically integrated hardware to industry standard commercial off-the-shelf (COTS) servers in a NFV entity 500. Certain performance measurements may be independent of the migration and thus may not be impacted. Examples of such performance measurements may include network functions such as handover or tracking area update (TAU)-related measurements. Therefore, the hardware-independent performance measurements can be reused as VNF performance measurements. Other performance measurements may be used to measure specific hardware usage or are tightly coupled to the specific hardware performance. The hardware-specific performance measurements may be significantly impacted by changes to the network resources allocated by the NFVI 510 to the VNFs 520. Examples of these performance measurements include specific processor usage, such as MME processor usage, and data volume and GPRS tunneling protocol (GTP)-related measurements. As a result, virtualized resource performance measurements may be desirable for at least this latter class of performance measurements.

FIG. 5, in addition to the virtualized components described above, also shows the collection of VNF and virtualized resource performance measurements. The existing mechanisms where measurement jobs are created by the EM 530 may be reused to collect VNF performance measurement data from the VNF 520. To collect the virtualized resource performance measurement, the EM 530 may start by requesting creation of a performance measurement job by the VNFM 550 through the Ve-Vnfm-Em interface. The performance measurement job may contain information elements used in the collection of the virtualized resource performance measurement data. These information elements may include parameters such as resource type and collection and reporting period used in measuring the performance of the NFV entity 500 during the scheduled performance measurement job.

Having received the performance measurement job request from the EM 530, the VNFM 550 may subsequently request creation of the performance measurement job 518 from the VIM 570 through the Vi-Vnfm interface to collect the desired virtualized resource performance measurement data. The request from the VNFM 550 may contain some or all of the information elements received from the EM 530.

The VIM 570, having received the performance measurement job request from the VNFM 550, may create the desired performance measurement job 518 and pass the performance measurement job 518 to the NFVI 510 via the Nf-Vi interface to collect virtualized resource performance measurement data from the NFVI 510. The performance measurement job 518 may contain the information elements received from VNFM 550.

The NFVI 510 may generate a measurement according to the schedule specified in the performance measurement job 518. The measurement may be sent at the time indicated by the information elements from the NFVI 510 to the VIM 570 via the Nf-Vi interface.

In response to receiving the virtualized resource performance measurement data, the VIM 570 may forward the data to the VNFM 550 via the Vi-Vnfm interface. In embodiments in which multiple VNFMs 550 are present and manage different VNFs 520, the VIM 570 may forward the appropriate performance measurement data to the VNFM 550 managing the subject VNF 520 or Virtual Network Function Component (VNFC) associated with the performance measurement job 518.

The VNFM 550, in response to receiving the performance measurement data, may identify the VNF 520/VNFC in which the virtualized resource is used. Having determined the resource and identified associated VNF 520/VNFC, the VNFM 550 may subsequently forward the data to the EM 530 managing the VNF 520/VNFC via the Ve-Vnfm-Em interface.

The EM 530 may also receive the performance measurement data from the VNFs 520/VNFCs. The EM 530 may use existing mechanisms to send the performance measurement data obtained from the associated VNFM 550 to the NM 540. The EM 530 may transmit the performance measurement data to the NM 540 via the Itf-N. The EM 530 or NM 540 may make a determination to adjust resource allocation for one or more of the VNFs 520 in response to the virtualized resource performance measurement data.

The virtualized resource performance measurement data may contain the performance data of the virtualized resource used by the VNF 520. For example, the virtualized resource performance measurement data may include the usage data of the CPU/VM 512, memory 514 and networking capabilities 516. The VNF 520 and virtualized resource performance measurement data can be used together to optimize the VNF performance. For example, if it is detected that the number of outgoing/incoming GTP data packets on the S1-U interface between the eNB and the Serving Gateway is unexpected low during peak hours (say, 8 am-5 pm), then the EM 530 may create a measurement job at the VNFM 550 to measure the virtualized resource usage during this time period. If the EM 530 determines that the virtualized resource performance measurement data (e.g. vCPU/VM usage, memory usage) are loaded, then the EM 530 or NM 540 may conclude that the usage of vCPU/VM 512 and/or memory 514 for the VNF 520 may be saturated, and should be expanded. The EM 530 may subsequently indicate to the VIM 570 via the VNFM 550 to allocate an increased amount of virtualized resources to the affected VNF 520 from the resources available in the resource pool of the NFVI 510 (and/or re-allocate underutilized resources from a VNF 520 whose virtualized resource performance measurement data indicates that fewer virtualized resources may be a viable option for that VNF 520).

Figure 6:
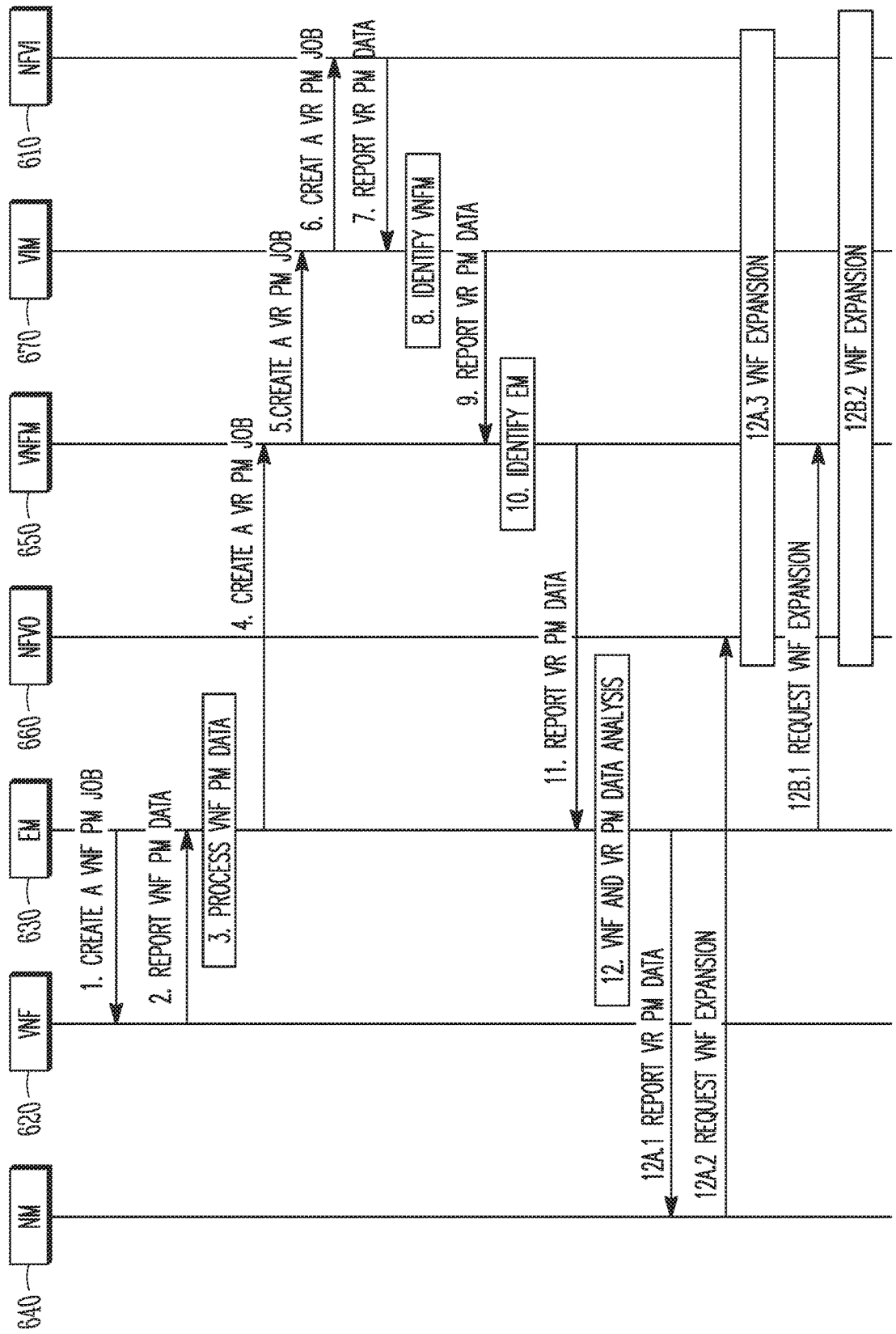
FIG. 6 illustrates a flow diagram of VNF and virtualized resource performance management in accordance with some embodiments.

FIG. 6 illustrates a flow diagram of VNF and virtualized resource performance management in accordance with some embodiments. The flow diagram may be performed by one or more of the network entities shown in FIGS. 1-4 and may involve both virtualized and physical network resources and may constitute means for providing the various operations and functionality described in reference to FIGS. 5 and 6. At operation 1, the EM 630 may schedule a VNF performance management job, containing information elements, such as resource type and collection and reporting periods, at VNF 620 to collect the VNF performance management data. The EM 630 may schedule VNF performance management jobs individually or may batch several VNF performance management jobs for different VNFs 620 managed by the EM 630 together. The EM 630 may similarly schedule the performance management jobs with the VNF(s) 620 immediately or may wait for until a predetermined event, such as several VNF performance management jobs are desired, a particular time of day has arrived or network resource use has reached a predetermined level.

At operation 2. VNF performance measurement data may be generated at the VNF 620 according to the schedule specified in the VNF performance management job. The VNF performance management job may be, for example, to measure the number of outgoing GTP data packets on the S5/S8 interface from the serving gateway to the PDN-GW. In different embodiment, EM 640 may collect the VNF performance management data from VNF 620 at the time determined in the VNF performance management job.

At operation 3, the EM 640 may process the VNF performance management data to determine the characteristics of the VNF performance management data. The EM 640 may determine whether the VNF performance management data meets or is inadequate (i.e., exceeds or falls short) of one or more predetermined performance levels. For example, during the performance management data processing, the EM 640 may detect that the number of outgoing GTP data packets is lower than expected/desired. Thus, the VNF performance may be inadequate through the use of too many or too few virtualized resources.

Based on the analysis undertaken on the VNF performance management data, the EM 630 may decide to examine the cause of any performance-related issue. For example, the EM 630 may attempt to determine whether virtualized resources at NFVI 610 used for the performance management job undertaken by the VNF(s) 620 are overloaded. The EM 630 may determine that further investigation is warranted when determining that poor VNF performance as indicated in the 10 PM data may have to do with the VR performance at the NFVI 610.

To proceed with such an examination, the EM 630 may first request the VNFM 650 to create a performance management job at operation 4. The performance management job may contain information elements, such as resource type and collection and reporting periods, used to collect virtualized resource performance management data related to the performance management job. The range of measurements may be defined in 3GPP TS 32.426 and the measurement types and measured resources and times to be executed may be defined in 3GPP TS 32.410. Thus, as one of its functions, REQ-MAMO-PM-FUN-1, the EM 630 may be able to administer the performance management job at the VNFM 650 to schedule the virtualized resource performance management data collection.

The VNFM 650 may then request, at operation 5, that the VIM 670 create a performance management job in line with the performance measurement data desired. The performance management job request also may contain the information elements received from the EM 640, as indicated by European Telecommunications Standards Institute (ETSI) Global Specification (GS) NFV-IFA 006.

The VIM 670 may create the desired performance management job containing the information elements received from the VNFM 650. The performance management job may be sent, at operation 6, to the NFVI 610 to collect virtualized resource performance management data from the NFVI 610.

The NFVI 610 may generate one or more measurements using the VNF(s) indicated by the performance management job. The timing of each measurement may be generated based on the schedule specified in the performance management job. In different embodiment, VIM 670 may collect the virtualized resource performance management data at the NFVI 610 at the time determined by the PM job at operation 7.

The VIM 670 may receive and coordinate the virtualized resource performance management data of the NFVI 610. At operation 8, the VIM 670 may examine the virtualized resource performance management data to identify the VNFM 650 managing the subject VNF/VNFC from which the virtualized resource performance management data was obtained.

In response to identifying the VNFM 650 managing the subject VNF/VNFC, the VIM 670 may forward the virtualized resource performance management data to the identified VNFM 650 at operation 9. If multiple VNFMs 650 are identified at operation 8, the VIM 670 may report the appropriate virtualized resource performance management data for each VNFM 650 to the VNFMs 650 at the same time or may report the appropriate virtualized resource performance management data individually to the VNFMs 650 at different times.

Similar to the above, at operation 10, the VNFM 650 may examine the virtualized resource performance management data received from the VIM 670 to identify the VNF/VNFC 620 where the virtualized resource was used. The VIM 670 may also identify the EM 630 managing the VNF/VNFC 620. Thus, as one of its functions, REQ-MAMO-PM-FUN-2, the VNFM 650 may be able to identify the VNF/VNFC 620 that consumes the virtualized resource from which the virtualized resource performance management data is collected and forward the virtualized resource performance management data to the EM 630 managing the subject VNF/VNFC 620.

In response to identifying the EM 630 managing the VNF/VNFC 620, the VNFM 650 may report over the Ve-Vnfm-Em reference point the virtualized resource performance management data to the identified EM 630 managing the subject VNF/VNFC 620 at operation 11. If multiple EMs 630 are identified at operation 10, the VNFM 650 may report the appropriate virtualized resource performance management data for each EM 630 to the EM 630 at the same time or may report the appropriate virtualized resource performance management data individually to the EMs 630 at different times.

At operation 12, the EM 630 may analyze the virtualized resource performance management data and the performance of the VNF/VNFC 620. During the data analysis, the EM 630 may coordinate the performance of the VNF/VNFC 620 with the expected performance and results. The EM 630 may decide that the VNF/VNFC 620 performance is adequate, and thus virtualized resources for the VNF/VNFC 620 may be maintained, inadequate, and thus virtualized resources for the VNF/VNFC 620 should be increased or excessive, and thus virtualized resources for the VNF/VNFC 620 should be decreased. In addition to determining whether or not virtualized resource allocation is sufficient for a particular VNF/VNFC 620, the EM 630 may determine which virtualized resources should be adjusted for the VNF/VNFC 620. The EM 630 may make these determinations for all VNFs/VNFCs 620 managed by the EM 630 that have provided virtualized resource performance management data as part of the performance management job.

In response to the EM 630 determining that the VNF/VNFC 620 performance is adequate, the EM 630 may decide that no change is warranted for the virtualized resources of the VNF/VNFC 620. On the other hand, in response to the EM 630 determining that the VNF/VNFC 620 performance is inadequate, the EM 630 may decide that virtualized resources for the VNF/VNFC 620 may be increased. In this case, additional virtualized resources should be allocated from the pool of available resources of the VNFM 650. In response to the EM 630 determining that the VNF/VNFC 620 performance is excessive, the EM 630 may decide that virtualized resources for the VNF/VNFC 620 may be decreased. In this case, the EM 630 may decide that some virtualized resources of the VNF/VNFC 620 should be reallocated to the pool of available resources of the VNFM 650.

For example, the EM 630 may determine that the VNF performance management data (e.g. GTP data packet throughput) is low, but the virtualized resource performance management Data of vCPU/VM and memory are loaded. In this case, the EM 630 may in different embodiments either report the virtualized resource performance management data (and/or the VNF performance management data) to the NM 640 at operation 12a.1 or request the VNFM 650 to expand the vCPU/VM resources at operation 12b.1. In the former case, the NM 640 at operation 12a.2 may transmit a request to the NFVO 660 to expand the vCPU/VM resources. In response, the NFVO 660, VNFM 650, VIM 670, and NFVI 610 may perform the VNF expansion at operation 12a.3. In the latter case, at operation 12b.1 the EM 630 may request the VNFM 650 to expand the vCPU/VM resources. Again, in response, the NFVO 660, VNFM 650, VIM 670, and NFVI 610 may perform the VNF expansion at operation 12b.2.

If different sets of performance management data for different VNFs/VNFCs 620 indicate that the same virtualized resource (e.g., CPU) is excessive for a first VNF/VNFC 620 and insufficient for a second VNF/VNFC 620, the virtualized resource may, in some embodiments, first be reallocated from the first VNF/VNFC 620 to the available resource pool before being allocated to the second VNF/VNFC 620. This may permit the NM 640 or EM 620 to determine, for example, to which VNF/VNFC 620 to assign a virtualized resource if multiple requests for the virtualized resource exist and the available resource pool contains insufficient virtualized resources to fulfill all requests. As the NM 640 may manage the EMs 620 and thus may be able to determine the overall virtualized resource requests for all VNFs/VNFCs 620, the EM 620 may be limited to the virtualized resource requests for only those VNFs/VNFCs 620 managed by the EM 620. In some embodiments, the EM 630 may both report the virtualized resource performance management data to the NM 640 and transmit to the VNFM 650 a request the virtualized resource changes. In this case, the NFVO 660, VNFM 650, VIM 670, and NFVI 610 may wait for requests from both the EM 630 and the NM 640 to confirm that a change to the virtualized resource is desired prior to undertaking the virtualized resource reallocation.

Example 1 is an apparatus of a network entity comprising: a plurality of reference points connecting to different network components, and processing circuitry arranged to: schedule a virtualized resource performance measurement job in response to a determination, from Virtual Network Function (VNF) performance measurement data, of inadequate performance of a VNF; receive virtualized resource virtualized resource data from a VNF Manager (VNFM) in response to transmission of the resource performance measurement job to the VNFM; and request, based on the VNF performance measurement data and the virtualized resource performance measurement data, adjustment to a virtualized resource for the VNF.

In Example 2, the subject matter of Example 1 optionally includes that the apparatus comprises an element manager (EM) configured to manage the VNF and in communication with the VNFM through a Ve-Vnfm-Em reference point and with a Network Manager (NM) through an Itf-N reference point.

In Example 3, the subject matter of Example 2 optionally includes that in response to receipt of the virtualized resource performance measurement job from the EM, the VNFM is configured to request a VNFM virtualized resource performance measurement job from a Virtualized Infrastructure Manager (VIM) using a Vi-Vnfm reference point, and in response to receipt of the VNFM virtualized resource performance measurement job, the VIM is configured to request a VIM virtualized resource performance measurement job at a NFV Infrastructure (NFVI) using a Nf-Vi reference point.

In Example 4, the subject matter of Example 3 optionally includes that the NFVI is configured to generate the virtualized resource performance measurement data, at a request from the VIM virtualized resource performance measurement job, and transmit the virtualized resource performance measurement data to the VIM, and the VIM is configured to identify that the VNFM manages the VNF, and forward the virtualized resource performance measurement data to the VNFM, and the VNFM is configured to identify the VNF where the virtualized resource is used, and that the EM manages the VNF, and forward the virtualized resource performance measurement data to the EM.

In Example 5, the subject matter of Example 4 optionally includes that in response to receipt of the virtualized resource performance measurement data, the EM is configured to analyze the VNF performance measurement data and the virtualized resource performance measurement data, and send a request to the VNFM to adjust the virtualized resource in response to a determination that the virtualized resource is loaded and impacts the VNF performance.

In Example 6, the subject matter of any one or more of Examples 2-5 optionally include that the EM is configured to forward the VNF performance measurement data and the virtualized resource performance measurement data to the NM.

In Example 7, the subject matter of any one or more of Examples 2-6 optionally include that in response to receipt of the VNF performance measurement data and the virtualized resource performance measurement data, the NM is configured to analyze the VNF performance measurement data and the virtualized resource performance measurement data, and transmit a request from an Os-Ma-Nfvo reference point to a Network Function Virtualization Orchestrator (NFVO) to adjust the virtualized resource in response to a determination that the virtualized resource is loaded and impacts the VNF performance.

In Example 8, the subject matter of any one or more of Examples 1-7 optionally include that the virtualized resource comprises one of a virtualized central processing unit (vCPU), a virtual machine, memory and networking.

In Example 9, the subject matter of any one or more of Examples 1-8 optionally include that the processing circuitry is further arranged to: schedule a VNF performance measurement job that the VNF performance measurement data is received in response to transmission of the VNF performance measurement job to the VNF.

In Example 10, the subject matter of any one or more of Examples 1-9 optionally include that the processing circuitry is further arranged to: determine that the virtual resource is overloaded and the overload of the virtual resource is a cause of the inadequate performance, and in response to the determination, request an increase of the virtualized resource for the VNF from the VNFM.

In Example 11, the subject matter of any one or more of Examples 1-10 optionally include that the processing circuitry is further arranged to: determine that the virtual resource is overloaded and the overload of the virtual resource is a cause of the inadequate performance, and in response to the determination, transmit at least one of the VNF performance measurement data and the virtualized resource performance measurement data to a Network Manager (NM) for the NM to request an increase of the virtualized resource for the VNF from the VNFM.

In Example 12, the subject matter of any one or more of Examples 1-11 optionally include that the virtualized resource performance measurement job comprises a plurality of information elements to schedule virtual performance data collection, and the plurality of information elements comprise: a resource type that indicates a resource where the virtualized resource performance measurement data is to be collected, a collection period that indicates when the virtualized resource performance measurement data is to be generated, and a reporting period that indicates when the virtualized resource performance measurement data is to be reported.

In Example 13, the subject matter of any one or more of Examples 1-12 optionally include, further comprising: an interface configured to communicate with one or more physical components external to the apparatus.

Example 14 is an element manager (EM) comprising: means for scheduling a virtualized resource performance measurement job in response to a determination, from Virtual Network Function (VNF) performance measurement data, of inadequate performance of a VNF; means for receiving virtualized resource virtualized resource data from a VNF Manager (VNFM) in response to transmission of the resource performance measurement job to the VNFM; and one of: means for requesting, based on the VNF performance measurement data and the virtualized resource performance measurement data, adjustment to a virtualized resource for the VNF by the VNFM, and means for providing at least one of the VNF performance measurement data and the virtualized resource performance measurement data to a Network Manager (NM) for the NM to request adjustment to the virtualized resource by a Network Function Virtualization Orchestrator (NFVO).

In Example 15, the subject matter of Example 14 optionally includes, further comprising: in response to receipt of the virtualized resource performance measurement data, means for analyzing the VNF performance measurement data and the virtualized resource performance measurement data that a request to the VNFM to adjust the virtualized resource is in response to a determination that the virtualized resource is loaded and impacts the VNF performance.

In Example 16, the subject matter of any one or more of Examples 14-15 optionally include that the virtualized resource comprises one of a virtualized central processing unit (vCPU), a virtual machine, memory and networking.

In Example 17, the subject matter of any one or more of Examples 14-16 optionally include further comprising: means for scheduling a VNF performance measurement job that the VNF performance measurement data is received in response to transmission of the VNF performance measurement job to the VNF.

In Example 18, the subject matter of any one or more of Examples 14-17 optionally include further comprising: means for determining that the virtual resource is overloaded and the overload of the virtual resource is a cause of the inadequate performance, and in response to the determination, means for requesting an increase of the virtualized resource for the VNF from the VNFM.

In Example 19, the subject matter of any one or more of Examples 14-18 optionally include further comprising: means for determining that the virtual resource is overloaded and the overload of the virtual resource is a cause of the inadequate performance, and in response to the determination, means for transmitting the at least one of the VNF performance measurement data and the virtualized resource performance measurement data to the NM for the NM to request an increase of the virtualized resource for the VNF from the VNFM.

In Example 20, the subject matter of any one or more of Examples 14-19 optionally include that the virtualized resource performance measurement job comprises a plurality of information elements to schedule virtual performance data collection, and the plurality of information elements comprise: a resource type that indicates a resource where the virtualized resource performance measurement data is to be collected, a collection period that indicates when the virtualized resource performance measurement data is to be generated, and a reporting period that indicates when the virtualized resource performance measurement data is to be reported.

Example 21 is a computer-readable storage medium that stores instructions for execution by one or more processors of an element manager (EM), the one or more processors to configure the EM to: schedule a Virtual Network Function (VNF) performance measurement job at a VNF; receive VNF performance measurement data in response to the VNF performance measurement job; schedule a virtualized resource performance measurement job in response to a determination, from VNF performance measurement data, of inadequate performance of a VNF; receive virtualized resource virtualized resource data from a VNF Manager (VNFM) in response to the resource performance measurement job to the VNFM; and one of: request expansion of a virtualized resource for the VNF by the VNFM based on the VNF performance measurement data and the virtualized resource performance measurement data, and provide at least one of the VNF performance measurement data and the virtualized resource performance measurement data to a Network Manager (NM) for the NM to request expansion of the virtualized resource by a Network Function Virtualization Orchestrator (NFVO).

In Example 22, the subject matter of Example 21 optionally includes that the one or more processors further configure the EM to: analyze the VNF performance measurement data and the virtualized resource performance measurement data, and determine that the virtualized resource is loaded and impacts the VNF performance.

In Example 23, the subject matter of any one or more of Examples 21-22 optionally include that the virtualized resource comprises one of a virtualized central processing unit (vCPU), a virtual machine, memory and networking.

In Example 24, the subject matter of any one or more of Examples 21-23 optionally include that the virtualized resource performance measurement job comprises a plurality of information elements to schedule virtual performance data collection, and the plurality of information elements comprise: a resource type that indicates a resource where the virtualized resource performance measurement data is to be collected, a collection period that indicates when the virtualized resource performance measurement data is to be generated, and a reporting period that indicates when the virtualized resource performance measurement data is to be reported.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus comprising:
one or more processors arranged to cause an element manager (EM) to:
create a virtualized resource (VR) performance measurement (PM) collection task at a Virtual Network Function Manager (VNFM), the VNFM coupled with the EM through a Ve-Vnfm-Em reference point, the VR PM collection task to collect VR PM data of a VR of a VNF indicated by the EM via another VR PM collection task created at a Virtualized Infrastructure Manager (VIM), wherein the VR PM collection task indicates a measurement resource, reporting period, and collection time;
receive, through the Ve-Vnfm-Em reference point, the VR PM data from the VNFM in response to creation of the VR PM collection task in the VNFM; and
transmit, to a Network Manager (NM) connected with the EM through an Itf-N reference point, the VR PM data.

2. The apparatus of claim 1, wherein the one or more processors are further arranged to:
create a PM collection task that specifies PM data to collect, the PM data related to a network function.

3. The apparatus of claim 2, wherein the one or more processors are further arranged to:
request collection by the VNF of the PM data related to a network function indicated by the PM collection task.

4. The apparatus of claim 3, wherein the one or more processors are further configured to:
receive the PM data directly from the VNF.

5. The apparatus of claim 4, wherein the one or more processors are further configured to:
determine from the PM data that VNF performance is inadequate with regard to one or more predetermined performance levels; and
create the VR PM collection task at the VNFM in response to a determination that the performance is inadequate.

6. The apparatus of claim 1, wherein:
in response to receipt of the other VR PM collection task, the VIM is configured to request a VIM VR PM collection task at a NFV Infrastructure (NFVI) through a Nf-Vi reference point.

7. The apparatus of claim 6, wherein:
the NFVI is configured to collect the VR PM data and transmit the VR PM data to the VIM, the VIM is configured to store the VR PM data in VIM storage and forward the VR PM data to the VNFM, and
the VNFM is configured to store the VR PM data in VNFM storage and forward the VR PM data to the EM.

8. The apparatus of claim 1, wherein the one or more processors are further arranged to:
request, based on the VR PM data, adjustment to the VR of the VNF by the NM.

9. The apparatus of claim 8, wherein the one or more processors are further arranged to:
create a VNF PM collection task for the VNF to collect VNF PM data related to a network function indicated by the VNF PM collection task and transmit the VNF PM data directly to the EM;
analyze the VNF PM data and the VR PM data; and
send a request to the VNFM to adjust the VR in response to a determination that VNF performance is detrimentally affected by a deficiency of the VR.

10. The apparatus of claim 8, wherein the one or more processors are further arranged to:
create a VNF PM collection task for the VNF to collect VNF PM data related to a network function indicated by the VNF PM collection task and transmit the VNF PM data directly to the EM;
analyze the VNF PM data and the VR PM data; and
transmit a request from an Os-Ma-Nfvo reference point to a Network Function Virtualization Orchestrator (NFVO) to adjust the VR in response to a determination that VNF performance is detrimentally affected by a deficiency of the VR.

11. The apparatus of claim 1, wherein:
the VR comprises one of a virtualized central processing unit (vCPU), a virtual machine, memory or networking.

12. The apparatus of claim 1, wherein the one or more processors are further arranged to:
determine that the VR is overloaded and overload of the virtual resource is a cause of inadequate performance of the VR, and
in response to the determination, one of:
request an increase of the VR from the VNFM, or
transmit the VR PM data to the NM for the NM to request an increase of the VR from the VNFM.

13. The apparatus of claim 1, wherein:
the VR PM collection task is configured to schedule the VR data collection, and includes:
a resource type that indicates a resource where the VR PM data is to be collected,
a collection period that indicates when the VR PM data is to be collected, and
the reporting period that indicates when the VR PM data is to be reported to the VIM.

14. A method for operating an element manager (EM), comprising:
at the EM:
creating a virtualized resource (VR) performance measurement (PM) collection task at a Virtual Network Function Manager (VNFM), the VNFM coupled with the EM through a Ve-Vnfm-Em reference point, the VR PM collection task to collect VR PM data of a VR of a VNF indicated by the EM via another VR PM collection task created at a Virtualized Infrastructure Manager (VIM), wherein the VR PM collection task indicates a measurement resource, reporting period, and collection time;
receiving, through the Ve-Vnfm-Em reference point, the VR PM data from the VNFM in response to creation of the VR PM collection task in the VNFM; and
transmitting, to a Network Manager (NM) connected with the EM through an ltf-N reference point, the VR PM data.

15. The method of claim 14, further comprising:
creating a PM collection task that specifies PM data to collect, the PM data related to a network function; and
requesting collection by the VNF of the PM data related to the network function indicated by the PM collection task.

16. The method of claim 15, further comprising:
receiving the PM data from the VNF;
determining from the PM data that VNF performance is inadequate with regard to one or more predetermined performance levels; and
creating the VR PM collection task at the VNFM in response to a determination that the performance is inadequate.

17. The method of claim 14, wherein:
in response to receipt of the other VR PM collection task, the VIM is configured to request a VIM VR PM collection task at a NFV Infrastructure (NFVI) through a Nf-Vi reference point.

18. The method of claim 14, further comprising:
requesting, based on the VR PM data, adjustment to the VR of the VNF by the NM;
creating a VNF PM collection task for the VNF to collect VNF PM data related to a network function indicated by the VNF PM collection task and transmit the VNF PM data directly to the EM;
analyzing the VNF PM data and the VR PM data; and
sending a request to the VNFM to adjust the VR in response to a determination that VNF performance is detrimentally affected by a deficiency of the VR.

19. The method of claim 1, wherein:
the VR PM collection task is configured to schedule the VR data collection, and includes:
a resource type that indicates a resource where the VR PM data is to be collected,
a collection period that indicates when the VR PM data is to be collected, and
the reporting period that indicates when the VR PM data is to be reported to the VIM.

20. A non-transitory computer accessible memory medium storing program instructions executable by one or more processors of an element manager (EM) to:
create a virtualized resource (VR) performance measurement (PM) collection task at a Virtual Network Function Manager (VNFM), the VNFM coupled with the EM through a Ve-Vnfm-Em reference point, the VR PM collection task to collect VR PM data of a VR of a VNF indicated by the EM via another VR PM collection task created at a Virtualized Infrastructure Manager (VIM), wherein the VR PM collection task indicates a measurement resource, reporting period, and collection time;
receive, through the Ve-Vnfm-Em reference point, the VR PM data from the VNFM in response to creation of the VR PM collection task in the VNFM; and transmit, to a Network Manager (NM) connected with the EM through an ltf-N reference point, the VR PM data.

21. The non-transitory computer accessible memory medium of claim 20, wherein the program instructions are further executable to:
   create a PM collection task that specifies PM data to collect, the PM data related to a network function; and
   request collection by the VNF of the PM data related to the network function indicated by the PM collection task.

22. The non-transitory computer accessible memory medium of claim 20, wherein:
   in response to receipt of the other VR PM collection task, the VIM is configured to request a VIM VR PM collection task at a NFV Infrastructure (NFVI) through a Nf-Vi reference point.

23. The non-transitory computer accessible memory medium of claim 20, wherein the program instructions are further executable to:
   request, based on the VR PM data, adjustment to the VR of the VNF by the NM;
   create a VNF PM collection task for the VNF to collect VNF PM data related to a network function indicated by the VNF PM collection task and transmit the VNF PM data directly to the EM;
   analyze the VNF PM data and the VR PM data; and
   send a request to the VNFM to adjust the VR in response to a determination that VNF performance is detrimentally affected by a deficiency of the VR.

24. The non-transitory computer accessible memory medium of claim 20, wherein:
   the VR PM collection task is configured to schedule the VR data collection, and includes:
      a resource type that indicates a resource where the VR PM data is to be collected,
      a collection period that indicates when the VR PM data is to be collected, and
      the reporting period that indicates when the VR PM data is to be reported to the VIM.

* * * * *